(12) United States Patent
Guzik et al.

(10) Patent No.: US 12,222,539 B1
(45) Date of Patent: Feb. 11, 2025

(54) CHANNEL SPACER FOR A LIGHT GUIDE

(71) Applicant: Lumitex, Inc., Strongsville, OH (US)

(72) Inventors: Carolyn Guzik, Strongsville, OH (US); Jessica Quartermaine, Medina, OH (US)

(73) Assignee: Lumitex, Inc., Strongsville, OH (US)

( * ) Notice: Subject to any disclaimer, the term of this patent is extended or adjusted under 35 U.S.C. 154(b) by 0 days.

(21) Appl. No.: 18/501,347

(22) Filed: Nov. 3, 2023

Related U.S. Application Data

(60) Provisional application No. 63/515,977, filed on Jul. 27, 2023.

(51) Int. Cl.
*F21V 8/00* (2006.01)
*G02F 1/1333* (2006.01)

(52) U.S. Cl.
CPC ......... *G02B 6/0088* (2013.01); *G02B 6/0078* (2013.01); *G02F 1/133314* (2021.01); *G02F 1/133325* (2021.01); *G02F 1/133328* (2021.01); *G02F 1/13336* (2013.01)

(58) Field of Classification Search
CPC .................. G02B 6/0088; G02F 1/133328
See application file for complete search history.

(56) References Cited

U.S. PATENT DOCUMENTS

| 5,838,405 | A | * | 11/1998 | Izumi | G09G 3/20 |
| | | | | | 349/122 |
| 11,209,585 | B2 | * | 12/2021 | Hirasawa | F21V 29/503 |
| 2006/0244923 | A1 | * | 11/2006 | Mitani | G03B 37/04 |
| | | | | | 353/31 |
| 2011/0235308 | A1 | * | 9/2011 | Kang | G02B 6/0078 |
| | | | | | 362/97.1 |
| 2015/0253612 | A1 | * | 9/2015 | Hasegawa | G02F 1/133308 |
| | | | | | 349/58 |
| 2017/0123133 | A1 | * | 5/2017 | Park | G02B 6/0078 |
| 2018/0011374 | A1 | | 1/2018 | Baek et al. | |
| 2018/0372944 | A1 | | 12/2018 | Difelice et al. | |
| 2021/0208331 | A1 | | 7/2021 | Hsu et al. | |

FOREIGN PATENT DOCUMENTS

| CN | 206311790 U | * | 7/2017 |
| JP | 2014231732 A | | 12/2014 |

* cited by examiner

*Primary Examiner* — Keith G. Delahoussaye
(74) *Attorney, Agent, or Firm* — Renner, Otto, Boisselle & Sklar, LLP

(57) ABSTRACT

A light guide spacer is provided for maintaining sufficient spacing between a diffuser and a light emitting surface of a light guide. The light guide spacer maintaining spacing between the diffuser and the light guide has the exemplary benefit of providing more uniform light emission from the light emitting surface and protecting the light emitting surface (e.g., from physical damage, cleaning solutions, etc.). The light guide spacer may span the length of the light guide and diffuser, maintaining spacing along a length of the light guide, providing mounting of the diffuser and light guide, and maintaining a position of the diffuser, such that it protects the light emitting surface of the light guide.

17 Claims, 7 Drawing Sheets

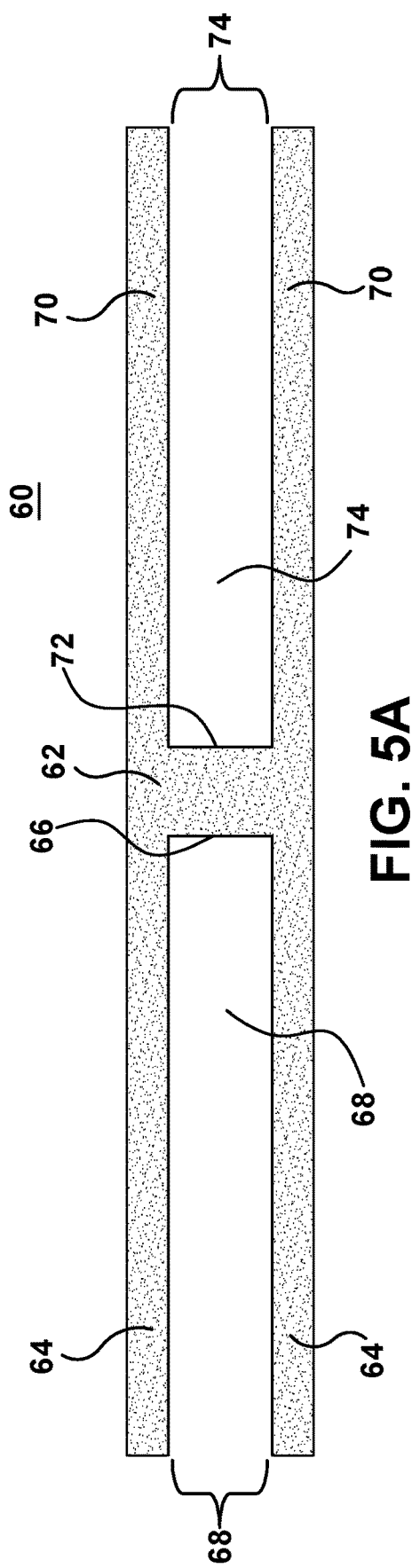
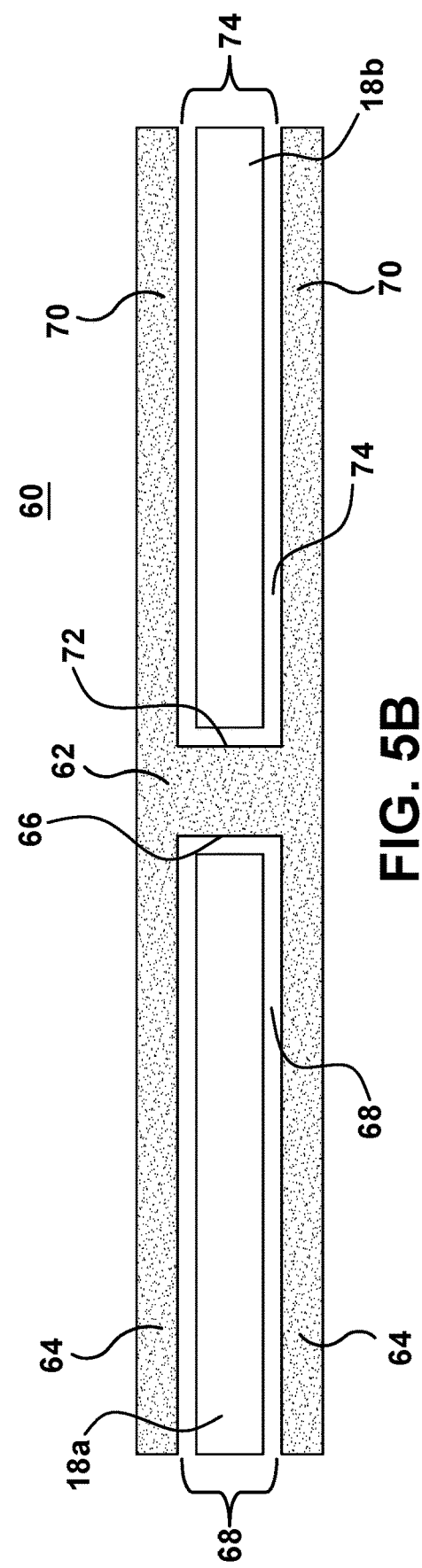

CHANNEL SPACER FOR A LIGHT GUIDE

This application claims the benefit of U.S. Application No. 63/515,977, filed Jul. 27, 2023, which is incorporated herein by reference in its entirety.

TECHNICAL FIELD

The present disclosure relates generally to medical lighting and more particularly to a mount for a light guide and diffuser.

SUMMARY

It is difficult to ensure uniform light emission by maintaining sufficient spacing between a diffuser and a light emitting surface of a light guide, while at the same time protecting the light emitting surface from damage and cleaning materials.

The present disclosure provides a light guide spacer comprising an "M" channel that may span the total length of the light guide and diffuser. The shape of the channel spacer allows for spacing, mounting, and protection against ingress/damage of the light guide. The channel spacer also allows for a diffuser to be mounted securely over the full surface of the light guide. The present disclosure also provides an "H" channel that maintains a consistent and uninterrupted illumination effect when combining multiple light guides.

In one embodiment, the light guide spacer is used to maintain a position of a light guide to a bore of a magnetic resonance imaging (MRI) machine. Existing solutions for mounting a light guide relative to the bore are hard mounted into a surface of the MRI that the diffuser is mounted to. The light guide spacer described herein allows for more flexibility of the diffuser and light guide than the mounted solutions currently seen.

The channel spacer also allows for variability in length to meet many different applications and provides a more secure protection from ingress and cleaning materials from the diffuser to the light guide while maintaining optimal, optical spacing between the diffuser and the light guide.

The present disclosure provides a s light guide pacer that may be manufactured using any suitable technique (e.g., machined, extruded, 3D printed, etc.). The channel spacer has three protrusions. Properties of the middle protrusion (e.g., thickness) may be adjusted to optimize optical performance depending on lighting application, light source, and diffuser material. The light guide spacer may ensure that cleaning products and liquid ingress does not impact the light guide and only touches the diffuser portion of the lighting solution.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIGS. 5A and 5B are schematic side views of an H-channel for joining two light guides.

Figure 1:
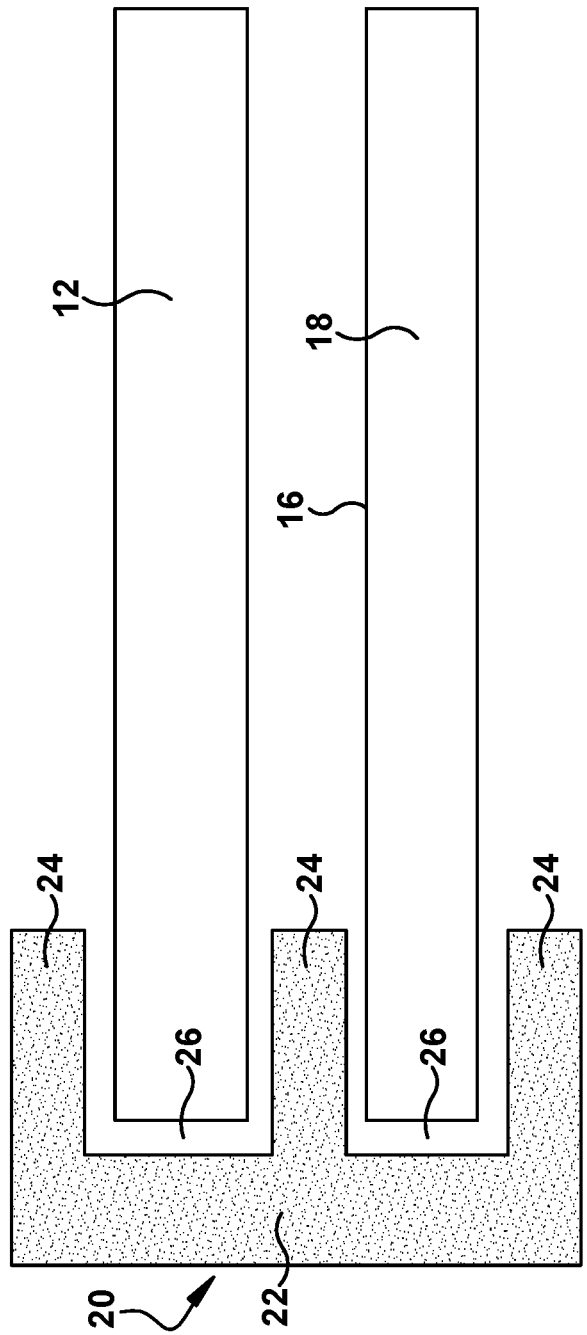
FIG. 1 is a schematic side view of a light guide spacer, light guide, and diffuser.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

This patent application pertains to a light guide spacer for maintaining sufficient spacing between a diffuser and a light emitting surface of a light guide. The light guide spacer maintains spacing between the diffuser and the light guide and has the exemplary benefit of providing more uniform light emission from the light emitting surface and of protecting the light emitting surface (e.g., from physical damage, cleaning solutions, etc.). The light guide spacer may span the length of the light guide and diffuser, maintaining spacing along a length of the light guide, providing mounting of the diffuser and light guide, and maintaining a position of the diffuser, such that it protects the light emitting surface of the light guide.

The light guide spacer may serve multiple purposes. For example, the light guide spacer may maintain the position of a light guide relative to the bore of a magnetic resonance imaging (MRI) machine. Currently available solutions for mounting a diffuser and light guide to an MRI machine are hard mounted into the surface of the MRI onto which the diffuser is mounted. However, these existing solutions offer limited flexibility in terms of the light guide and diffuser positioning. The light guide spacer may provide significantly enhanced flexibility compared to these hard mounted solutions.

Figure 2:
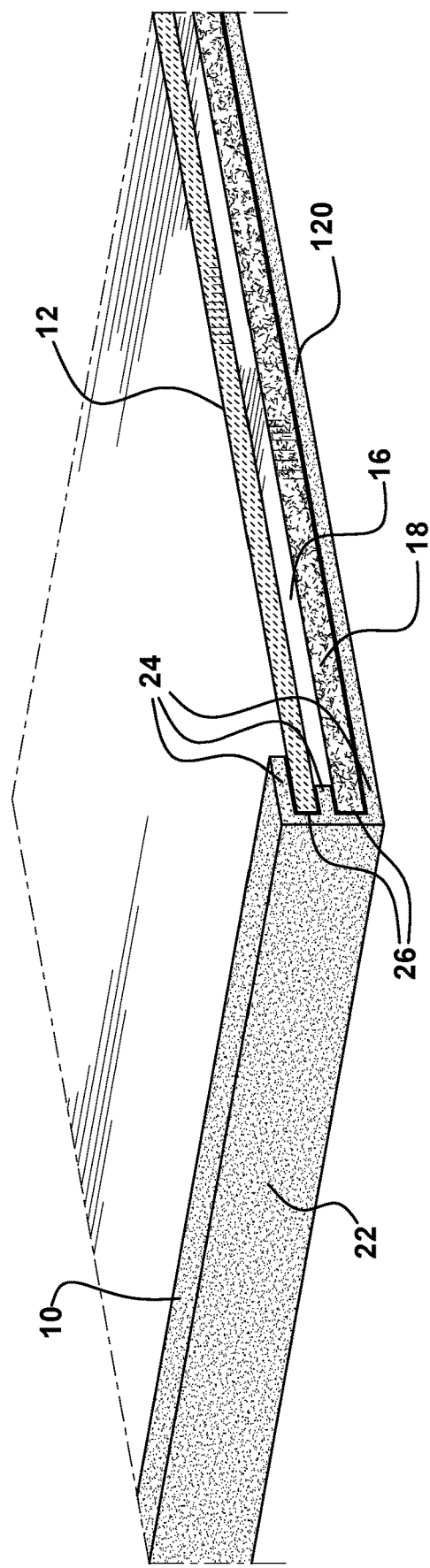
FIG. 2 is a front perspective view of the light guide spacer having a back reflector, the light guide, and the diffuser.

Turning to FIGS. 1 and 2, a light guide spacer 10 is shown for maintaining spacing between a diffuser 12 and a light emitting surface 16 of a light guide 18. The light guide spacer 10 includes at least two M-channels 20 for maintaining a position of the diffuser 12 and the light guide 18 relative to one another.

Light received by the light guide from a light source 80 (shown in FIG. 3) is transmitted within the light guide (e.g., via total internal reflection) and is emitted from the light guide 18 via the light emitting surface 16. The light guide spacer 10 may maintain a position of the light guide 18 and diffuser 12, such that the light emitted from the light emitting surface 16 passes through the diffuser 12. The light passing through the diffuser 12 may be diffused more uniformly into the environment (e.g., reducing a visual appearance of bright or dark areas in the emitted light). For example, the diffuser 12 may scatter the light in various directions to reduce intensity differences that may be generated by the light emitting surface 16 to create a more visibly homogenous illumination.

In one embodiment, the light guide is a light emitting diode array. For example, the light emitting diode array may be a backing supporting as the light source an array of light emitting diodes.

Figure 3:
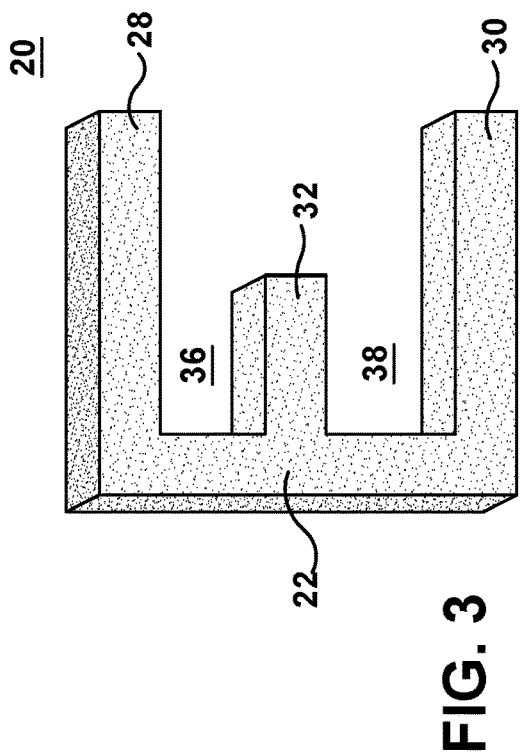
FIG. 3 is a side perspective of an M-channel.

Turning to FIG. 3, each of the M-channels 20 (also shown in FIG. 1) has a main body 22, three protrusions 24, and two openings 26. The three protrusions 24 extend from the main body 22 and include a diffuser protrusion 28, a light guide protrusion 30, and a middle protrusion 32. The middle protrusion 32 is located between the diffuser protrusion 28 and the light guide protrusion 30. The two openings 26 are located between the three protrusions 24. The two openings 26 include a diffuser opening 36 (located between the diffuser protrusion 28 and the middle protrusion 32) and a light guide opening 38 (located between the middle protrusion 32 and the light guide protrusion 30).

The two openings 26 are located between the three protrusions 24. The two openings 26 include a diffuser opening 36 (located between the diffuser protrusion 28 and the middle protrusion 32) and a light guide opening 38 (located between the middle protrusion 32 and the light guide protrusion 30).

The three protrusions 24 (i.e., the diffuser protrusion 28, the light guide protrusion 30, and the middle protrusion 32) may each have distinct or the same physical attributes. For example, the lengths, thicknesses, widths, and overall geometries of these protrusions can vary based on design specifications or intended applications. For instance, the diffuser protrusion 28 may be longer than the light guide protrusion 30, or vice versa, depending on specific functional requirements. Similarly, the thicknesses of the protrusions can be adjusted to optimize certain properties or performance metrics. For example, a thickness of the middle protrusion 32 may be varied depending on an optimal distance between the light emitting surface and the diffuser. In this way, the M-channels offer flexibility in tailoring the individual protrusions to achieve desired outcomes while maintaining the overall integrity of the M-channel 20 structure.

Figure 4:
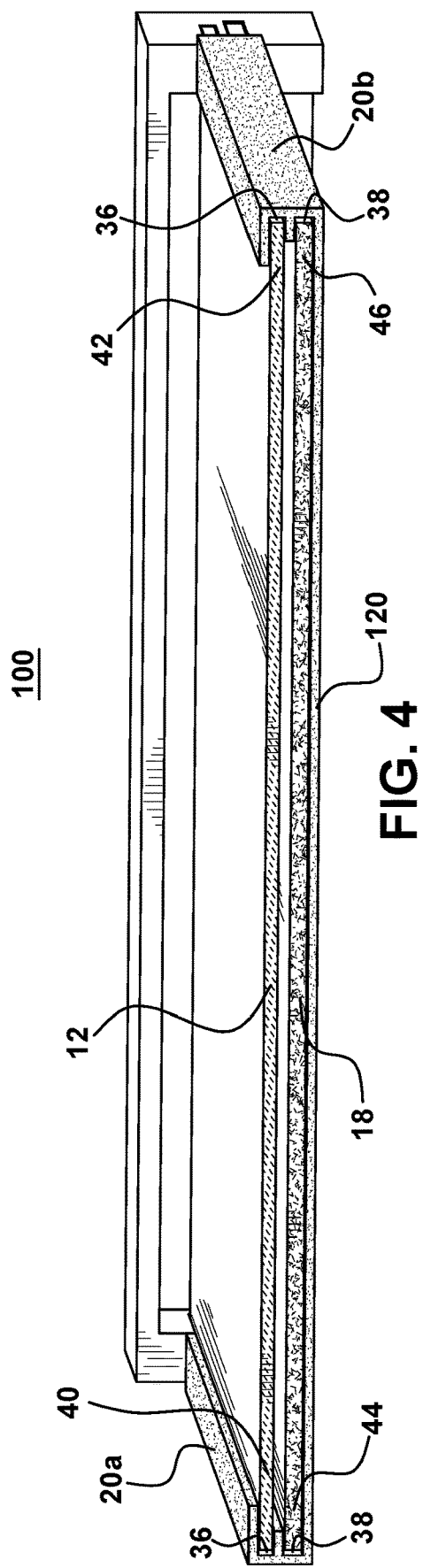
FIG. 4 is a front perspective view of an illumination system.

Turning to FIG. 4, the diffuser opening 36 of a first M-channel 20a of the at least two M-channels 20 is configured to receive a first lateral edge 40 of the diffuser 12, and the diffuser opening 36 of a second M-channel 20b of the at least two M-channels 20 is configured to receive a second lateral edge 42 of the diffuser 12 located opposite the first lateral edge 40 of the diffuser 12. The light guide opening 38 of the first M-channel 20a is configured to receive a first lateral edge 44 of the light guide 18, and the light guide opening 38 of the second M-channel 20b is configured to receive the second lateral edge 46 of the light guide 18 located opposite the first lateral edge 44 of the light guide 18, such that a spacing is maintained between the diffuser 12 and the light guide 18.

For each of the M-channels 20, the three protrusions 24 may have a separation sized such that, when the diffuser opening 26 receives a first lateral edge 40 or second lateral edge 42 of the diffuser 12, a seal is formed between the diffuser 12 and the M-channel 20. The seal may be formed such that solutions (e.g., cleaning solutions) applied to the diffuser 12 are blocked from reaching the light guide 18.

For example, the dimensions of the diffuser opening 36 may approximately match a thickness of the diffuser 12, such that placing the diffuser 12 into the diffuser opening 36 causes the diffuser protrusion 28 and the middle protrusion 32 to deform slightly to accommodate the diffuser 12 (e.g., ensuring a snug fit). Similarly, the dimensions of the light guide opening 38 may approximately match a thickness of the light guide 18, such that placing the light guide 18 into the light guide opening 38 causes the light guide protrusion 30 and the middle protrusion 32 to deform slightly to accommodate the light guide 18. This arrangement advantageously offers durable and reliable sealing effects against environmental elements such as moisture, dust, and other contaminants. In addition, by creating a seal between the diffuser 12 and the light guide 18, contaminants may be prevented from entering the optical path of the light guide, maintaining the optical quality and efficiency of the light guide 18. That is, a clean optical path between the light guide 18 and the diffuser 12 may ensure that the desired light distribution, color, and uniformity are achieved.

The light guide spacer 10 may have any suitable length. That is, the light guide spacer 10 may have different lengths chosen dependent upon the application. For example, the length of each of the two M-channels 20 may be greater than three-quarters of a length of both the light guide 18 and the diffuser 12. The length of the M-channel 20 may also be greater than 80% of a length of both the light guide 18 and the diffuser 12. The length of the M-channel 20 may also be greater than 90% of a length of both the light guide 18 and the diffuser 12. The length of the M-channel 20 may also span the total length of both the light guide 18 and the diffuser 12.

This adaptable length of the light guide spacer 10 introduces enhanced possibilities for controlling light diffusion and propagation characteristics, allowing for precise adjustment of luminance distribution and light scattering properties. The adaptable length of the light guide spacer 10 thus offers a flexible solution for optimizing illumination uniformity and visual comfort across various applications, ranging from displays and lighting fixtures to optical communication devices and beyond. Flexibility in length ensures the ability to tailor light diffusion systems according to specific requirements, thereby yielding adaptable and efficient lighting and display technologies.

Turning to FIG. 5A, the light guide spacer 10 may include an H-channel 60. The H-channel includes a central body 62, a first set of two outcroppings 64 extending from a first side 66 of the central body 62, and a first light guide notch 68 formed between the first set of two outcropping 64. The first set of two outcroppings 64 may be parallel to one another, such that a size of the first light guide notch is consistent. The H-channel 60 also includes a second set of two outcroppings 70 extending from a second side 72 of the central body 62 and a second light guide notch 74 formed between the second set of two outcroppings 70, such that the first light guide notch 68 is located opposite the second light guide notch 74 relative to the central body 62. The second set of two outcroppings 70 may be parallel to one another as well.

Turning to FIG. 5B, the light guide 18 may comprise a first light guide 18a and second light guide 18b that is physically separate from the first light guide 18a. The first light guide notch 68 may be configured to receive a distal edge 78 of the first light guide 18a and the second light guide notch 74 may be configured to receive a distal edge 78 of the second light guide 18b. Alternatively, the first light guide notch 68 may be configured to receive a lateral edge 44 of the first light guide 18a and the second light guide notch 74 may be configured to receive a lateral edge 44 of the second light guide 18b. The first light guide 18a and the second light guide 18b may be positioned such that a light emitting surface 16 of the first light guide 18a is maintained in a same plane as a light emitting surface 16 of the second light guide 18b.

The use of an H-channel 60 as described may alleviate the problem of maintaining a consistent and uninterrupted illumination effect when combining multiple light guides 18, thereby enhancing the aesthetic appeal and functionality of illuminated structures and devices. In addition, the H-channel may facilitate precise positioning of the light guides 18, ensuring minimal offset and angular deviation while eliminating visible gaps and irregularities at the junction of two light guides 18a, 18b. Furthermore, the H-channel 60 may advantageously join two light guides 18a, 18b with minimal disturbance to light output and uniformity, thereby creating the visual appearance of a single, continuous light transmission path. The H-channel 60 may be used to combine multiple light guides 18 (i.e., the H-channel is not limited to combining only two light guides). By receiving a distal edge 78 of two light guides 18a, 18b, the light emitted by the two light guides 18a, 18b may visually appear as if being emitted by a single larger light guide. To do so A-E (below) may be optimized along with material and surface treatments (i.e., varied reflectance, diffusion, lensing, etc.):

A: Slot height;
B: Joint length;
C: Length of slot/coverage of light guide;
D: Shape of acceptance slot (box vs. optimized curve to spread light); and
E: Shape of outer edge (box vs. taper or curve to let more/less light pass).

Figure 6A:
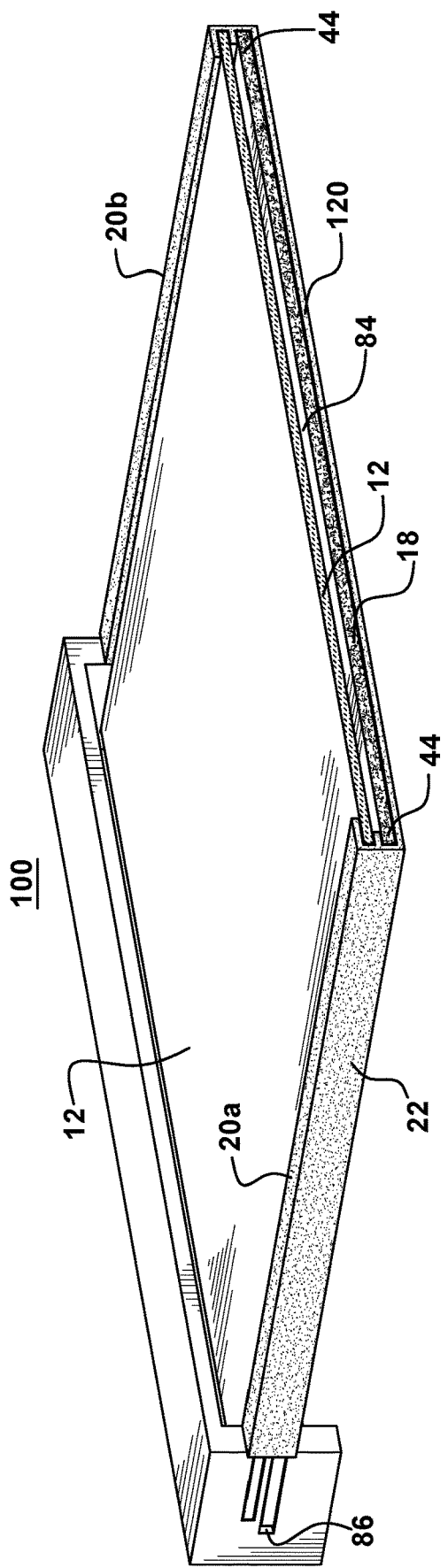
FIG. 6A is a side perspective view of an illumination system.
Figure 6B:
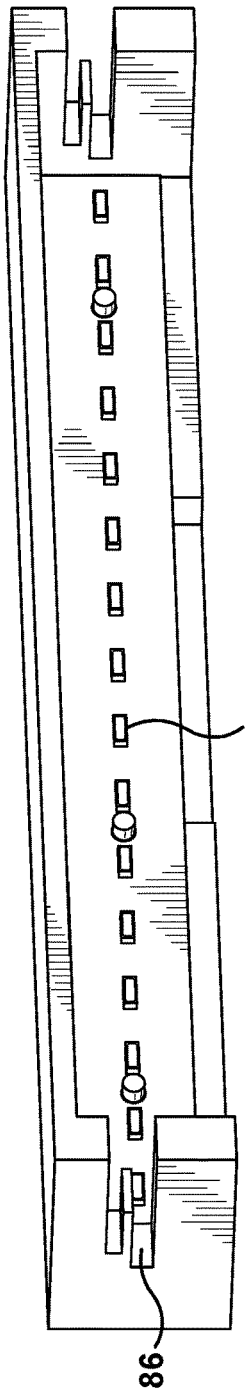
FIG. 6B is a side perspective view of a light source.
Figure 6C:
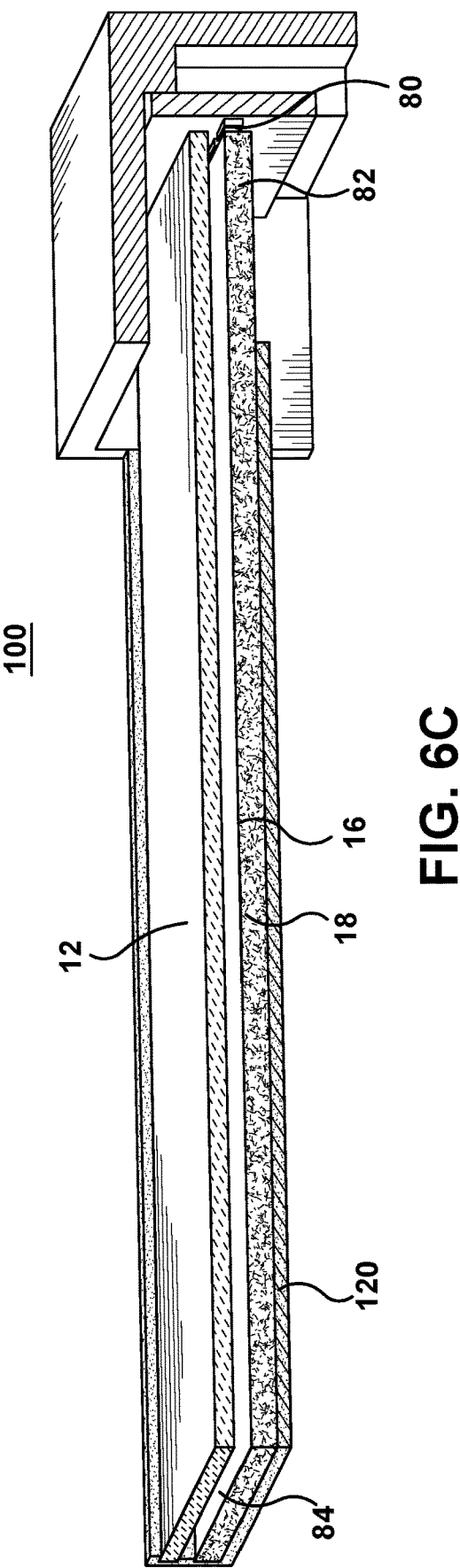
FIG. 6C is a cross sectional view of an illumination system.
Figure 7:
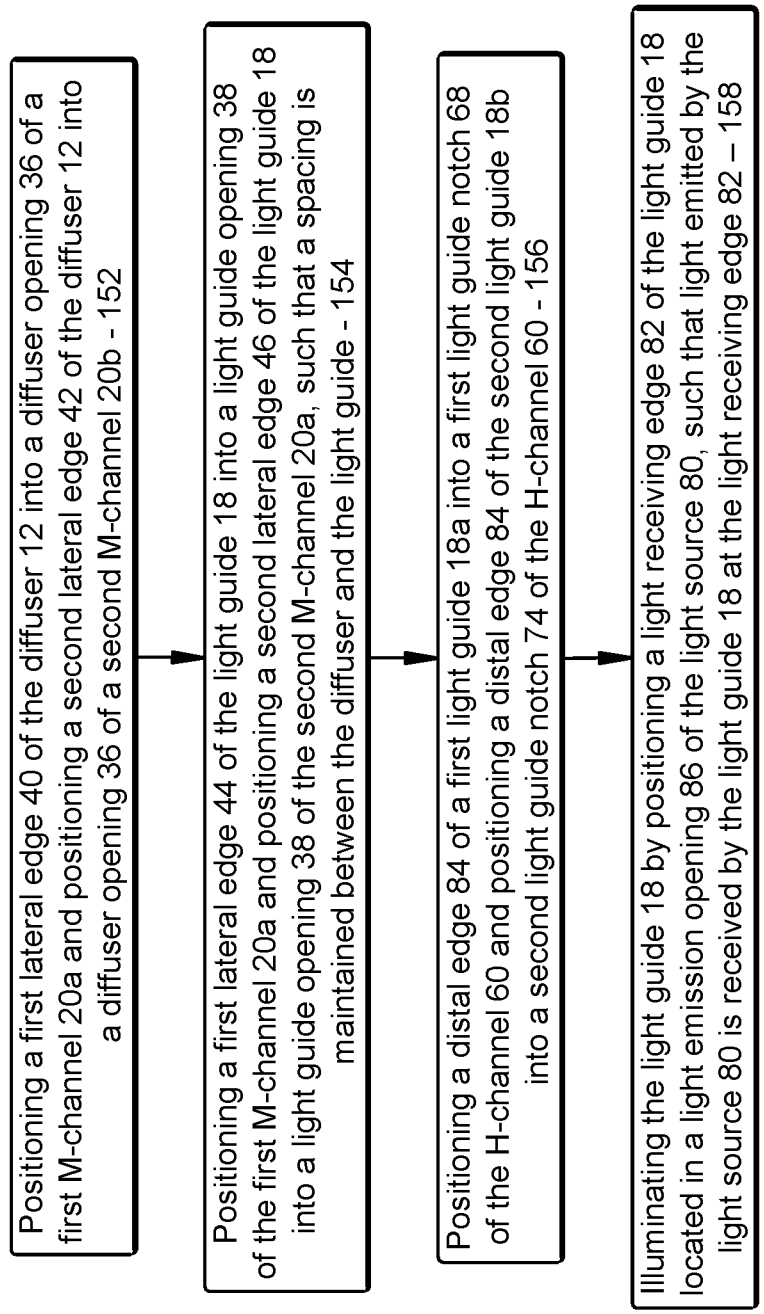
FIG. 7 is a flow diagram of an exemplary method for maintaining spacing between a diffuser and a light emitting surface of a light guide.

Turning to FIG. 6A-6C, the light guide 18 may receive light emitted from a light source 80 at a light receiving edge 82 of the light guide 18 located opposite a distal edge 84 of the light guide 18. The light receiving edge 82 of the light guide 18 may be received in a light emission opening 86 of the light source 80. The two M-channels 20 may each extend along a lateral edge 44 of the light guide 18 from the light emission opening 86 of the light source 80 towards a distal edge 84 of the light guide 18.

The light guide spacer 10 may also be included in an illumination system 100. The illumination system 100 includes a light guide 18, a diffuser 12, and optionally a light source. The light guide 18 receives light from a light source 80 at a light receiving edge 82 and emits the received light via a light emitting surface 16 of the light guide 18. The diffuser 12 diffuses light passing through the diffuser 12 as described above. As described above, the light guide spacer 10 maintains a spacing between the diffuser 12 and the light emitting surface 16 of the light guide 18.

As described above, maintaining an optimal distance between the diffuser 12 and the light guide 18 may influence the quality and efficiency of light distribution, as well as the overall performance of the illumination system 100. The diffuser opening 36 and light guide opening 38 aid in maintaining an optimal distance between the diffuser 12 and the light guide 18 respectively, ensuring uniformity in light dispersion of the illumination system. When the distance between the diffuser 12 and the light guide 18 is appropriately set, the diffuser 12 may have sufficient space to scatter and homogenize the light emitted from light emitting surface 16 of the light guide 18. Improper spacing between the diffuser 12 and the light guide 18 can lead to areas of over- or under-illumination, compromising the quality of the illuminated environment. In addition, unwanted effects like color shifts, uneven brightness, and unwanted reflections can occur if the diffuser 12 is too close or too far from the light guide 18.

The light guide protrusion 30 of the first M-channel 20a may be connected or joined with the light guide protrusion 30 of the second M-channel 20b to form a back reflector 20. The back reflector 120 may be formed such that the light guide protrusion 30 of the first M-channel is integrally formed with the light guide protrusion 30 of the second M-channel. The back reflector 120 aids in improving light extraction and distribution within the illumination system 100. The back reflector 100 redirect light that would otherwise be lost through the sides or back of the light guide 18 back into the guided path for more efficient use.

According to another aspect of the invention, there is provided a method 150 for maintaining spacing between a diffuser 12 and a light emitting surface 16 of a light guide 18 by using a light guide spacer 10 including at least two M-channels 20. In step 152, a first lateral edge 40 of the diffuser 12 is positioned into a diffuser opening 36 of a first M-channel 20a and a second lateral edge 42 of the diffuser 12 is positioned into a diffuser opening 36 of a second M-channel 20b. In step 154, a first lateral edge 44 of the light guide 18 is positioned into a light guide opening 38 of the first M-channel 20a and a second lateral edge 46 of the light guide 18 is positioned into a light guide opening 38 of the second M-channel 20a, such that a spacing is maintained between the diffuser and the light guide.

In optional step 156, a distal edge 84 of a first light guide 18a is positioned into a first light guide notch 68 of the H-channel 60 and a distal edge 84 of the second light guide 18b is positioned into a second light guide notch 74 of the H-channel 60.

In optional step 158, the light guide 18 is illuminated by positioning a light receiving edge 82 of the light guide 18 located in a light emission opening 86 of the light source 80, such that light emitted by the light source 80 is received by the light guide 18 at the light receiving edge 82.

The invention also includes a method for producing the described light guide spacer 10 spacer. The light guide spacer 10, alternatively referred to as the M-channel 20, may be manufactured via a variety of techniques, such as machining, extrusion, or 3D printing. The resulting light guide spacer 10 has a three-pronged design. The properties of the middle prong, alternatively referred to as middle protrusion 32, such as its thickness, may be adjusted to optimize optical performance. These adjustments will be contingent on a range of factors, including lighting application, light source, and diffuser material.

The light guide spacer 10 ensures that cleaning products and liquid ingress do not affect the light guide 18 and only come into contact with the diffuser 12 of the illumination solution. This design consideration contributes to both the durability and the optimal performance of the illumination system.

This novel method and apparatus described herein presents a substantial improvement over existing solutions in terms of flexibility, protection, and optical performance. These improvements represent the inventive step and novelty required for patentability. Furthermore, it provides an effective solution to the problem of ensuring uniform light emission while also maintaining adequate protection from damage and cleaning materials.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A light guide spacer for maintaining spacing between a diffuser and a light emitting surface of a light guide comprising:
    at least two M-channels each having:
        a main body;
        three protrusions extending from the main body and including a diffuser protrusion, a light guide protrusion, and a middle protrusion located between the diffuser protrusion and the light guide protrusion; and
        two openings located between the three protrusions and including:
            a diffuser opening located between the diffuser protrusion and the middle protrusion; and
            a light guide opening located between the middle protrusion and the light guide protrusion;
    wherein the diffuser opening of a first M-channel of the at least two M-channels is configured to receive a first lateral edge of the diffuser, and the diffuser opening of a second M-channel of the at least two M-channels is configured to receive a second lateral edge of the diffuser located opposite the first lateral edge of the diffuser; and
    wherein the light guide opening of the first M-channel is configured to receive a first lateral edge of the light guide, and the light guide opening of the second M-channel is configured to receive the second lateral edge of the light guide located opposite the first lateral edge of the light guide, such that a spacing is maintained between the diffuser and the light guide; and
    an H-channel having:
        a central body;
        a first set of two outcroppings extending from a first side of the central body, wherein the first set of two outcroppings are parallel to one another;
        a first light guide notch formed between the first set of two outcroppings;
        a second set of two outcroppings extending from a second side of the central body, wherein the second set of two outcroppings are parallel to one another;
        a second light guide notch formed between the second set of two outcroppings, such that the first light guide notch is located opposite the second light guide notch relative to the central body;
    wherein the light guide comprises a first light guide and a second light guide physically separate from the first guide;
    wherein the first light guide notch is configured to receive a distal edge of the first light guide; and
    wherein the second light guide notch is configured to receive a distal edge of the second light guide.

2. The light guide spacer of claim 1, wherein for each of the at least two M-channels, the three protrusions are separated such that:
    when the diffuser opening receives a lateral edge of the diffuser, a seal is formed between the diffuser and the M-channel such that cleaning solution applied to the diffuser is prevented from reaching the light guide.

3. The light guide spacer of claim 1, wherein a length of each of the two M-channels is greater than three-quarters of a length of both the light guide and the diffuser.

4. The light guide spacer of claim 1, wherein the first light guide and the second light guide are positioned, such that a light emitting surface of the first light guide is maintained in a same plane as a light emitting surface of the second light guide.

5. The light guide spacer of claim 1, wherein:
    the light guide receives light emitted from a light source at a light receiving edge of the light guide located opposite a distal edge of the light guide;
    the light receiving edge of the light guide is received in a light emission opening of the light source; and
    the two M-channels each extend along a lateral edge of the light guide from the light emission opening of the light source towards a distal edge of the light guide.

6. The light guide spacer of claim 1, wherein the diffuser protrusion of the first M-channel and the diffuser protrusion of the second M-channel are connected to form a back surface and to physically connect the first M-channel and the second M-channel.

7. The light guide spacer of claim 6, wherein the back surface includes a reflector for reflecting light emitted from a rear surface of the light guide back towards the light guide, such that the reflected light is emitted from the light emitting surface of the light guide.

8. An illumination system comprising:
    a light guide configured to receive light at a light receiving edge and to emit the received light via a light emitting surface;
    a diffuser configured to diffuse light passing through the diffuser to reduce hot spots;
    a light guide spacer configured to maintain a spacing between the diffuser and the light emitting surface of the light guide, wherein the light guide spacer includes:
        at least two M-channels each having:
            a main body;
            three protrusions extending from the main body and including a diffuser protrusion, a light guide protrusion, and a middle protrusion located between the diffuser protrusion and the light guide protrusion; and
            two openings located between the three protrusions and including:
                a diffuser opening located between the diffuser protrusion and the middle protrusion; and
                a light guide opening located between the middle protrusion and the light guide protrusion;
        wherein the diffuser opening of a first M-channel of the at least two M-channels is configured to receive a first lateral edge of the diffuser, and the diffuser opening of a second M-channel of the at least two M-channels is configured to receive a second lateral edge of the diffuser located opposite the first lateral edge of the diffuser; and wherein the light guide opening of the first M-channel is configured to receive a first lateral edge of the light guide, and the light guide opening of the second M-channel is configured to receive the second lateral edge of the light guide located opposite the first lateral edge of the light guide, such that a spacing is maintained between the diffuser and the light guide; and an H-channel having:
 a central body;
 a first set of two outcroppings extending from a first side of the central body, wherein the first set of two outcroppings are parallel to one another;
 a first light guide notch formed between the first set of two outcroppings;
 a second set of two outcroppings extending from a second side of the central body, wherein the second set of two outcroppings are parallel to one another;
 a second light guide notch formed between the second set of two outcroppings, such that the first light guide notch is located opposite the second light guide notch relative to the central body;
wherein the light guide comprises a first light guide and a second light guide physically separate from the first guide;
wherein the first light guide notch is configured to receive a distal edge of the first light guide; and
wherein the second light guide notch is configured to receive a distal edge of the second light guide.

9. The illumination system of claim 8, wherein for each of the at least two M-channels, the three protrusions are separated such that:
when the diffuser opening receives a lateral edge of the diffuser, a seal is formed between the diffuser and the M-channel such that cleaning solution applied to the diffuser is prevented from reaching the light guide.

10. The illumination system of claim 8, wherein a length of each of the two M-channels is greater than three-quarters of a length of both the light guide and the diffuser.

11. The illumination system of claim 8, wherein the first light guide and the second light guide are positioned, such that a light emitting surface of the first light guide is maintained in a same plane as a light emitting surface of the second light guide.

12. The illumination system of claim 8, wherein:
the light guide receives light emitted from a light source at a light receiving edge of the light guide located opposite a distal edge of the light guide;
the light receiving edge of the light guide is received in a light emission opening of the light source; and
the two M-channels each extend along a lateral edge of the light guide from the light emission opening of the light source towards a distal edge of the light guide.

13. The illumination system of claim 8, wherein:
the diffuser protrusion of the first M-channel and the diffuser protrusion of the second M-channel are connected to form a back surface and to physically connect the first M-channel and the second M-channel; and
the back surface includes a reflector for reflecting light emitted from a rear surface of the light guide back towards the light guide, such that the reflected light is emitted from the light emitting surface of the light guide.

14. A method for maintaining spacing between a diffuser and a light emitting surface of a light guide comprising a first light guide and a second light guide physically separate from the first light guide by using a light guide spacer including at least two M-channels and an H-channel, wherein the method comprises:
positioning a first lateral edge of the diffuser into a diffuser opening of a first M-channel of the at least two M-channels;
positioning a second lateral edge of the diffuser located opposite the first lateral edge of the diffuser into a diffuser opening of a second M-channel of the at least two M-channels;
positioning a first lateral edge of the first light guide into a light guide opening of the first M-channel;
positioning a second lateral edge of the second light guide located into a light guide opening of the second M-channel, such that a spacing is maintained between the diffuser and the light guide;
positioning a second lateral edge of the first light guide locate opposite the first lateral edge of the first light guide into a first light guide notch of the H-channel;
positioning a first lateral edge of the second light guide located opposite the second lateral edge of the second light guide notch of the H-channel;
wherein each of the at least two M-channels include:
 a main body;
 three protrusions extending from the main body and including a diffuser protrusion, a light guide protrusion, and a middle protrusion located between the diffuser protrusion and the light guide protrusion; and
 two openings located between the three protrusions and including:
  the diffuser opening located between the diffuser protrusion and the middle protrusion; and
  the light guide opening located between the middle protrusion and the light guide protrusion; and
wherein the H-channel having:
 a central body;
 a first set of two outcroppings extending from a first side of the central body, wherein the first set of two outcroppings are parallel to one another;
 a first light guide notch formed between the first set of two outcroppings;
 a second set of two outcroppings extending from a second side of the central body, wherein the second set of two outcroppings are parallel to one another;
 a second light guide notch formed between the second set of two outcroppings, such that the first light guide notch is located opposite the second light guide notch relative to the central body.

15. The method of claim 14, wherein the positioning of the first lateral edge of the diffuser into the diffuser opening of the first M-channel forms a seal between the diffuser and the first M-channel and the positioning of the second lateral edge of the diffuser into the diffuser opening of the second M-channel forms a seal between the diffuser and the second M-channel, such that a cleaning solution applied to the diffuser is prevented from reaching the light guide.

16. The method of claim 14, wherein the first light guide and the second light guide are positioned, such that a light emitting surface of the first light guide is maintained in a same plane as a light emitting surface of the second light guide.

17. The method of claim 14, further comprising:
illuminating the light guide by positioning a light receiving edge of the light guide located in a light emission opening of the light source, such that light emitted by the light source is received by the light guide at the light receiving edge, wherein:
the two M-channels each extend along a lateral edge of the light guide from the light emission opening of the light source towards a distal edge of the light guide.

* * * * *